PIEZOELECTRIC MATERIALS

Filed June 3, 1971

United States Patent Office 3,697,430
Patented Oct. 10, 1972

3,697,430

PIEZOELECTRIC MATERIALS

Noboru Ichinose, Harutoshi Egami, Katsunori Yokoyama, and Yohachi Yamashita, Yokohama, Japan, assignors to Tokyo Shibaura Electric Co., Ltd., Kawasaki-shi, Japan Filed June 3, 1971, Ser. No. 149,613
Claims priority, application Japan, June 13, 1970, 45/50,719
Int. Cl. C04b *35/46*
U.S. Cl. 252—62.9 1 Claim

ABSTRACT OF THE DISCLOSURE

Piezoelectric materials having a composition which may be expressed by the general formula:

$$(1-x)PbTiO_3 \cdot xPb(Me_{1/2}Te_{1/2})O_3$$

(where Me represents at least one metal selected from the group consisting of Mg and Zn and $x$ denotes a value of 0.02 to 0.25).

This invention relates to piezoelectric materials and more particularly to piezoelectric materials of a binary metal oxide system: $PbTiO_3$-$Pb(Me_{1/2}Te_{1/2})O_3$ compounded by solid phase reaction (where Me is at least one metal selected from the group of Mg and Zn) which can be used under stable condition at temperatures even higher than 300° C. and is also adapted for use in a high frequency region of the order of mHz.

As is well known, piezoelectric materials are used in a broad field of application including elements for oscillating ultrasonic waves, transducer elements of, for example, mechanical filters, elements of ceramic filters and ceramic resonators and elements of vibrometers and accelerometers. For such uses, there have been developed improved forms of piezoelectric materials of a binary metal oxide system of $PbTiO_3$-$PbZrO_3$. Such improvements have been attempted by incorporating additives such as $Bi_2O_3$, $Cr_2O_3$, $MnO_2$ or ZnO in said binary metal oxide system of $PbTiO_3$-$PbZrO_3$. There have also been proposed piezoelectric materials of a ternary metal oxide system of $PbTiO_3$-$PbZrO_3$-$Pb(Mg_{1/3}Nb_{2/3})O_3$. However, those prior art piezoelectric materials had a high dielectric constant and a Curie point of about 300° C., and were not useful when the service prevailed temperatures higher than said level. They had further drawbacks in that they had a dielectric constant as high as about 1000 and were not suitable for use high frequency regions.

It is accordingly an object of this invention to provide piezoelectric materials which have a sufficiently low dielectric constant to be used as elements of high frequency filters and resonators.

Another object of the invention is to provide piezoelectric materials capable of operating under stable condition at high temperatures over 300° C.

According to this invention, there are provided piezoelectric materials having a composition which may be expressed by the general formula:

$$(1-x)PbTiO_3\text{-}xPb(Me_{1/2}Te_{1/2})O_3$$

(where Me represents at least one metal selected from the group consisting of Mg and Zn and $x$ denotes a value of 0.02 to 0.25).

Figure 1:
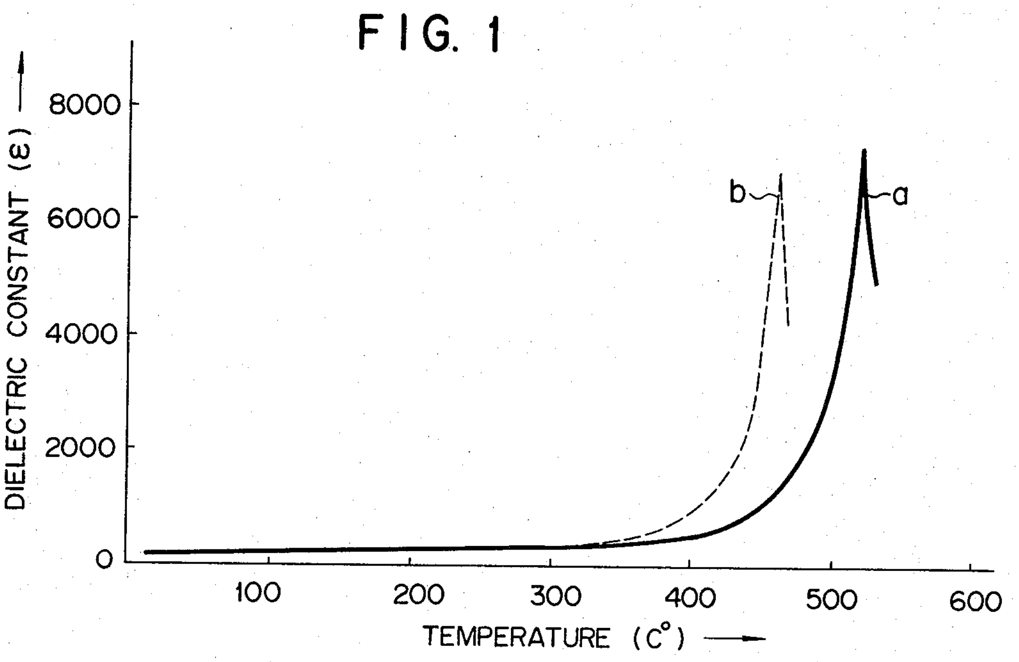
Figure 2:
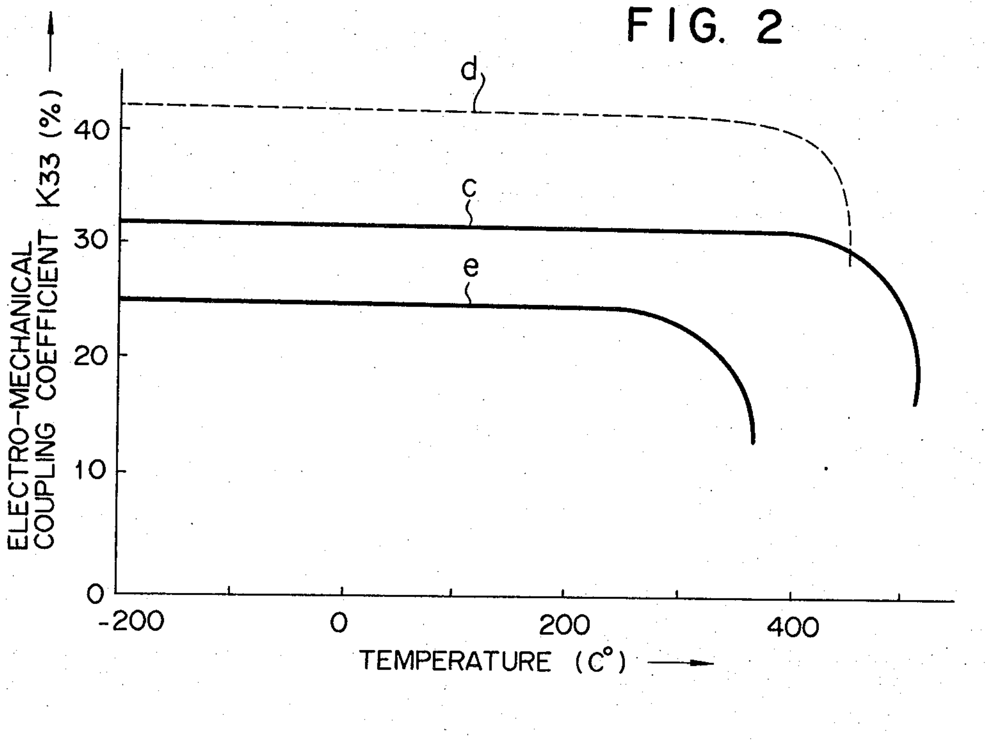

The present invention can be more fully understood from the following detailed description when taken in conjunction with reference to the appended drawings, in which:

FIG. 1 is a curve diagram showing changes with temperature in the dielectric constant of two examples of this invention; and FIG. 2 is a curve diagram showing changes with temperature in the electro-mechanical coupling coefficient (hereinafter designated as $K_{33}$) of the two examples of FIG. 1 and one reference sample of the prior art.

The piezoelectric materials of the invention are characterized by being prepared from a plurality of metal oxides of different valences compounded by solid phase reaction, that is, consisting of a binary system of perovskite structure: $(1-x)PbTiO_3\text{-}xPb(Me_{1/2}Te_{1/2})O_3$ (where Me represents at least one metal selected from the group consisting of Mg and Zn and $x$ denotes a value of 0.02 to 0.25).

The piezoelectric materials according to this invention may generally be easily manufactured by the known powder metallurgical process. For illustration, there are accurately weighed out the prescribed proportions of raw metal oxides such as PbO, $TiO_2$, $TeO_3$ and MeO. They are thoroughly mixed in a ball mill or the like. The raw materials used may consist of other compounds which may be thermally converted to oxides, such as hydroxides, carbonates and oxalates of metals. The mixture is presintered at a temperature of, for example, about 600° to 900° C. and pulverized again in a ball mill or the like to a particle size of about 1 to 2 microns. To said powders is added water or polyvinyl alcohol as a binder. The mass is subjected to a pressure of 0.5 to 2 tons/cm.$^2$ and sintered at a temperature of 1000° to 1250° C. Since part of the PbO, one of the components, is likely to be evaporated off during said sintering, the operation is carried out in a closed furnace. The mass should be maintained at a maximum temperature for a period ranging between 0.5 and 3 hours. The sintered mass of metal oxides thus obtained is polarized by the known process, for example, by fitting a pair of electrodes to both sides of the sintered body and impressing across the electrodes a voltage having a D.C. field intensity of 40 to 60 kv./cm. for one or two hours while in silicone oil at a temperature of 150° to 200° C.

The reason why, in the piezoelectric materials of a binary metal oxide system according to this invention represented by the formula of $$(1-x)PbTiO_3\text{-}xPb(Me_{1/2}Te_{1/2})O_3$$

$x$ is so chosen as to have a value of 0.02 to 0.25, that is, the proportion of $Pb(Me_{1/2}Te_{1/2})O_3$ is limited to 2 to 25 mol percent follows: If $x$ denotes a value of less than 0.02, the mass of compounded metal oxides will be more difficult to sinter and will fail to have the desired piezoelectric properties. If $x$ increases over 0.25, the Curie point will be lowered ($Tc$ will fall to below 400° C.), making it unsuitable under stable condition at higher temperatures than 300° C. In this case there will also arise a decline in the electro-mechanical coupling coefficient $K_{33}$.

$PbTiO_3$ has a Curie point approximating 500° C. and has heretofore been deemed as a hopeful component of piezoelectric materials. However, said oxide had no practical use because it raised a problem with sintering. In contrast, the piezoelectric materials of this invention include an additional component $Pb(Me_{1/2}Te_{1/2})O_3$, which concurrently acts as a mineralizer to facilitate the sintering of the piezoelectric system as a whole. This reduces the sintering temperature and suppresses the evaporation of PbO, one of the components, eventually enabling a compact piezoelectric product to be easily manufactured.

This invention will be more fully understood by reference to the examples which follow.

There were accurately weighed out the prescribed proportions of PbO, $TiO_2$, $TeO_3$ and MeO so as to constitute a piezoelectric material of a binary metal oxide system having a composition of $$(1-x)PbTiO_3\text{-}xPb(Me_{1/2}Te_{1/2})O_3$$

(where Me represented Mg or Zn and $x$ denoted a value of 0.01 to 0.30). The metal oxides were thoroughly mixed in a ball mill, presintered at a temperature of 850° C., and further pulverized again in a ball mill to a particle size of 1 to 2 microns. There were also prepared samples from the conventional compositions. Thus there were provided twenty-three samples of powdered metal oxides of both this invention and the prior art. After adding polyvinyl alcohol as a binder to these powdered samples, the mass was molded at a pressure of 1 ton/cm.$^2$ and heated to 1000° to 1250° C. and maintained for one and a half hours at said temperature, obtaining sintered rods 1 mm. in diameter and 3 mm. long. The rod samples were measured for density, and dielectric properties by fitting electrodes thereto. After being polarized by being impressed one and a half hours with a voltage having D.C. field intensity of 50 kv./cm. in silicone oil at 190° C., the piezoelectric properties of the mass were determined by the standard process set forth in, for example, the Proceedings of I.R.E., vol. 137, pp. 1378–1395, 1949. Table 1 below presents the results of determination, together with the compositions of the sintered samples.

Ceramic resonators from piezoelectric materials having the same compositions as Examples 7, 10 and 18 were prepared. A determination was made of changes with time and temperature in the resonance frequency of said resonators. The results are reported in Table 2 below, showing that said samples had sufficiently good time and temperature characteristics to be put to practical application.

TABLE 2

| | Ex. 7 | Ex. 10 | Ex. 18 |
|---|---|---|---|
| Temperature coefficient of resonance frequency (−40 to 80° C.) p.p.m./° C. | 71 | 66 | 60 |
| Change with time in resonance frequency (in one year) percent | +0.19 | +0.25 | +0.16 |

As seen from the foregoing samples, the piezoelectric materials of this invention have many useful features. They are useful under stable condition at temperatures over 300° C. and also in high frequency regions, and display excellent performance as various transducer elements due to minimal change in time and temperature characteristics.

The piezoelectric metal oxide materials of this invention may be used, for example, in the following applications:

(1) Determination of vibration, acceleration and pressure applied to high temperature objects approaching 500° C. or other objects subjected to sharply changing temperature and also determination of pressure prevailing in the interior of such high temperature objects.

TABLE 1

| Samples | $(1-x)PbTiO_3$-$xPb(Me_{1/2}Te_{1/2})O_3$ Me | $x$ | F.T. (° C.) | D | $\epsilon$ | $K_{33}$ (percent) | Qm | Tc (° C.) |
|---|---|---|---|---|---|---|---|---|
| Reference: | | | | | | | | |
| 1 | Mg | 0.01 | 1,260 | 7.20 | | | | |
| 2 | Zn | 0.01 | 1,260 | 7.15 | | | | |
| Example: | | | | | | | | |
| 1 | Mg | 0.02 | 1,240 | 7.51 | 208 | 0.32 | 417 | 521 |
| 2 | Zn | 0.02 | 1,240 | 7.53 | 185 | 0.34 | 368 | 515 |
| 3 | Mg | 0.05 | 1,200 | 7.68 | 271 | 0.38 | 503 | 503 |
| 4 | Zn | 0.05 | 1,200 | 7.70 | 240 | 0.37 | 407 | 500 |
| 5 | Mg | 0.07 | 1,180 | 7.80 | 253 | 0.42 | 612 | 484 |
| 6 | Zn | 0.07 | 1,180 | 7.82 | 226 | 0.44 | 584 | 481 |
| 7 | Mg<br>Zn | 0.03<br>0.04 | 1,180 | 7.81 | 247 | 0.45 | 590 | 483 |
| 8 | Mg | 0.10 | 1,150 | 7.88 | 199 | 0.40 | 435 | 468 |
| 9 | Zn | 0.10 | 1,150 | 7.87 | 182 | 0.42 | 466 | 460 |
| 10 | Mg | 0.14 | 1,130 | 7.74 | 165 | 0.38 | 397 | 453 |
| 11 | Zn | 0.14 | 1,130 | 7.77 | 160 | 0.39 | 376 | 449 |
| 12 | Mg<br>Zn | 0.07<br>0.07 | 1,130 | 7.76 | 168 | 0.40 | 391 | 450 |
| 13 | Mg | 0.18 | 1,110 | 7.70 | 159 | 0.36 | 322 | 432 |
| 14 | Zn | 0.18 | 1,110 | 7.68 | 147 | 0.38 | 348 | 438 |
| 15 | Mg | 0.22 | 1,090 | 7.64 | 173 | 0.35 | 303 | 420 |
| 16 | Zn | 0.22 | 1,090 | 7.60 | 158 | 0.36 | 319 | 419 |
| 17 | Mg | 0.25 | 1,060 | 7.55 | 141 | 0.31 | 296 | 403 |
| 18 | Zn | 0.25 | 1,060 | 7.57 | 139 | 0.33 | 277 | 401 |
| 19 | Mg<br>Zn | 0.20<br>0.05 | 1,060 | 7.58 | 150 | 0.34 | 300 | 410 |
| Reference: | | | | | | | | |
| 3 | Mg | 0.27 | 1,030 | 7.49 | 164 | 0.25 | 149 | 372 |
| 4 | Zn | 0.27 | 1,030 | 7.43 | 172 | 0.27 | 153 | 368 |

In Table 1 above, F.T. denotes the sintering temperature (° C.), D density (at 23° C.), $\epsilon$ the dielectric constant (kHz., at 23° C.), $K_{33}$ the electro-mechanical coupling coefficient (%), Qm the mechanical quality factor and Tc the Curie point. When a determination was made of changes with time in the dielectric constant $\epsilon$ of Examples 1 and 9, the curves shown in FIG. 1 were obtained. The curve $a$ represents Example 1 and the curve $b$, Example 9. When a determination was made of changes with time in the electro-mechanical coupling coefficient $K_{33}$ of said samples, the curves of FIG. 2 were obtained. Due to the high Curie point, said samples exhibited an electro-mechanical coupling coefficient $K_{33}$ which varied minimally over a broad temperature range of −200° to 400° C., proving that they would be available for use at the highest temperature ever allowed for any piezoelectric material. Referring to FIG. 2, the curve $c$, denotes Example 1, the curve $d$, Example 9, and the curve $e$, reference 3.

(2) Application of supersonic waves to high temperature objects

The piezoelectric materials of this invention can be used as a source of supersonic waves in working high temperature objects using supersonic waves or as an element for examining said objects using supersonic waves.

(3) Generation of strong supersonic waves

When subjected to vigorous vibrations, ordinary piezoelectric materials fail to be useful due to high heat build-up. However, those of the invention withstand application at a temperature exceeding 300° C., offering great advantage in generating strong supersonic waves by heavy vibrations.

(4) Application in high frequency regions

Conventional piezoelectric materials have the drawback that they have a large dielectric constant e.g., 1000, and are unadapted for use in high frequency regions. Generally, impedance Z is expressed by an equation $$Z=d(2\pi f\cdot\epsilon\cdot S)$$

(where $d$ represents the thickness of a sample, S its cross sectional area, $f$ the frequency used and $\epsilon$ a dielectric constant). Therefore, $d$ should be reduced in inverse proportion to $f$, so that the impedance may be eventually indicated as $Z\propto 1/(f^2\cdot\epsilon\cdot S)$. If $f$ increases, Z will sharply fall because $f^2$ is a large factor. Though the matching of Z requires S or $\epsilon$ to be reduced, it is more advantageous to decrease $\epsilon$, because S is subject to certain limitation from the standpoint of working. The piezoelectric materials of this invention have a dielectric constant $\epsilon$ of about 150, that is, as low as 1/5 to 1/10 of that of the prior art product. Accordingly, in the case where the prior art piezoelectric materials are available up to the frequency of 10 mHz., those of this invention permit application at a frequency as 50 mHz.

As mentioned above, it will be understood that the piezoelectric materials of the invention can be used in the applications which have been impossible with those of the prior art. A problem is caused when a high frequency filter or resonator changes frequency with time and temperature. Since, however, the present product varies minimally in frequency characteristics, it has several practical applications.

What is claimed is:

1. Piezoelectric metal oxide materials having a composition expressed by the general formula $$(1-x)PbTiO_3\text{-}xPb(Me_{1/2}Te_{1/2})O_3$$

where Me represents at least one metal selected from the group consisting of Mg and Zn, and $x$ denotes a value of 0.02 to 0.25.

References Cited

UNITED STATES PATENTS

| | | | |
|---|---|---|---|
| 3,268,453 | 8/1966 | Ouchi et al. | 252—62.9 |
| 3,309,168 | 3/1967 | Bayer | 252—62.9 X |
| 3,463,732 | 8/1969 | Banno et al. | |

OTHER REFERENCES

Bayer: "Journal of the American Ceramic Society," vol. 46, No. 12, December 1963, pp. 604–5.

TOBIAS E. LEVOW, Primary Examiner

J. COOPER, Assistant Examiner

U.S. Cl. X.R.

106—39 R